United States Patent [19]
Tsung Pan et al.

[11] Patent Number: 5,779,971
[45] Date of Patent: Jul. 14, 1998

[54] SOLDER JET PRINTHEAD

[75] Inventors: Alfred I. Tsung Pan, Sunnyvale; Ross R. Allen, Belmont; Eric G. Hanson, Burlingame, all of Calif.

[73] Assignee: Hewlett-Packard Company, Palo Alto, Calif.

[21] Appl. No.: 660,649

[22] Filed: Jun. 7, 1996

[51] Int. Cl.$^6$ .......................................................... B05D 1/02
[52] U.S. Cl. .............................. 266/237; 222/595; 427/422
[58] Field of Search ............................... 266/237, 236, 266/45; 222/593, 594, 595, 590; 427/422, 100, 427

[56] References Cited

U.S. PATENT DOCUMENTS

| | | |
|---|---|---|
| 4,828,886 | 5/1989 | Heiber ................................ 427/422 |
| 5,229,016 | 7/1993 | Hayes et al. ........................ 222/593 |
| 5,377,961 | 1/1995 | Smith et al. ........................ 266/237 |

*Primary Examiner*—Scott Kastler
*Attorney, Agent, or Firm*—Timothy Rex Croll

[57] ABSTRACT

A solder drop ejector is disclosed where a current through liquid solder in a channel flows in a direction opposite to the direction of current through a fixed conductor insulated from the channel. The magnetic fields generated repulse the solder toward an orifice to eject a droplet of solder. The dielectric layer separating the fixed conductor and the solder is formed of a film. The film may be made extremely thin, such as 0.1 microns, so that the necessary repulsion force generated by the oppositely flowing currents may be achieved with relatively low driving currents of 10–200 amperes. The thin dielectric film is not molded and is not required to provide mechanical support to a channel wall. Hence, the manufacturing of the resulting solder jet printhead is simplified and its reliability is improved.

21 Claims, 9 Drawing Sheets

SOLDER JET PRINTHEAD

FIELD OF THE INVENTION

This invention relates to drop generators which eject liquid metal drops.

BACKGROUND OF THE INVENTION

Devices for providing controlled sizes of liquid metal drops are used to create both electrical connections as well as mechanical connections between two pieces. For example, it is known to form solder bumps on a surface of an integrated circuit, where the solder bumps are eventually contacted by wires or contact pads from a second body to provide electrical and mechanical connections to the integrated circuit. The liquid drops of solder may also be used to form conductive traces, other conductive patterns, and mechanical structures. Typically, the solder bumps are 50–200 microns high.

The solder is usually heated to be in a molten state and, after ejection, freezes when it comes in contact with the workpiece. In most cases, the now solid solder drops are again melted for fusing the solder to a wire, a contact pad, or any other part.

The droplets are placed onto a workpiece in a predetermined pattern using a programmable X-Y positioning stage. The deposited drop volume can be controlled by placing multiple droplets, single droplets of adjustable volume, or a combination thereof.

Various types of these solder drop ejectors are known. One type uses piezoelectric transducers; however, the performance of the piezoelectric transducers is highly dependent on temperature conditions such that variations in temperature will vary the droplet size. Other drawbacks to these piezoelectric drop generators include the difficulty in achieving long-term mechanical stability in the adhesive bond affixing the piezoelectric transducer to a deformable element.

Figure 1:
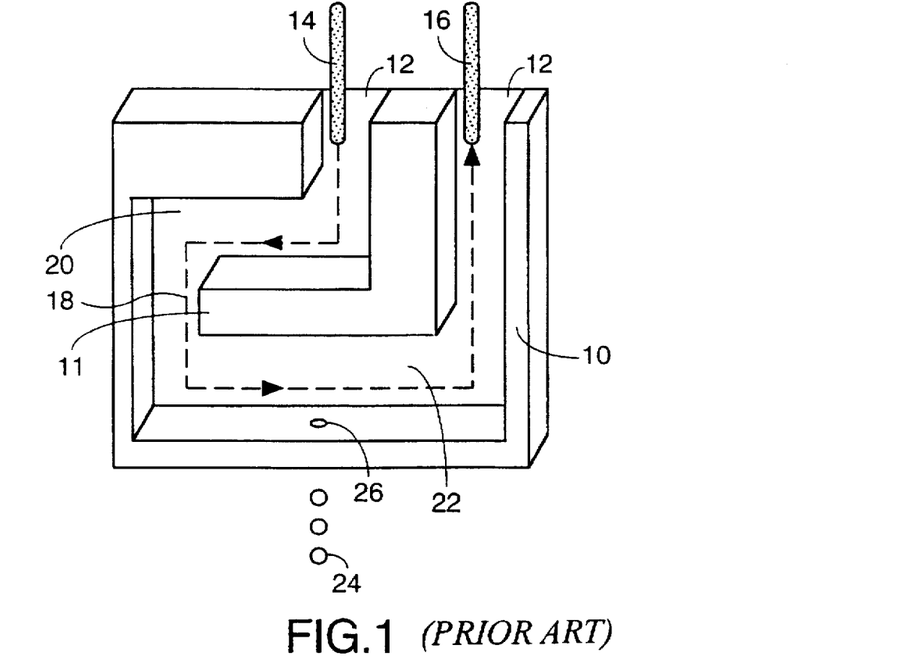
FIG. 1 illustrates a first type of solder drop ejector known to the inventors.

Another type of solder drop ejector is shown in FIG. 1 with its front panel removed. Chamber walls 10 and 11 define a solder channel 12 in which liquid solder resides. The solder is not shown. Electrodes 14 and 16 are in contact with the liquid solder. A power source is connected to electrodes 14 and 16 such that a current (shown by dashed line 18) flows through the solder in channel 12.

A flow of current through a back channel portion 20 is in a direction opposite to the flow of current through a front channel portion 22. The magnetic field created by the current through the liquid metal in the back channel portion 20 repels the liquid metal in the front channel portion 22. This repulsion acts as a pump to force a droplet 24 of liquid metal from orifice 26. Pulsed current through the liquid metal will produce droplets 24 of a selectable size based upon the magnitude and/or duration of the current pulse.

The repelling force varies as the inverse of the physical separation of the conductive paths (channel portions 20 and 22), so wall portion 11 should be made as thin as possible.

Figure 2:
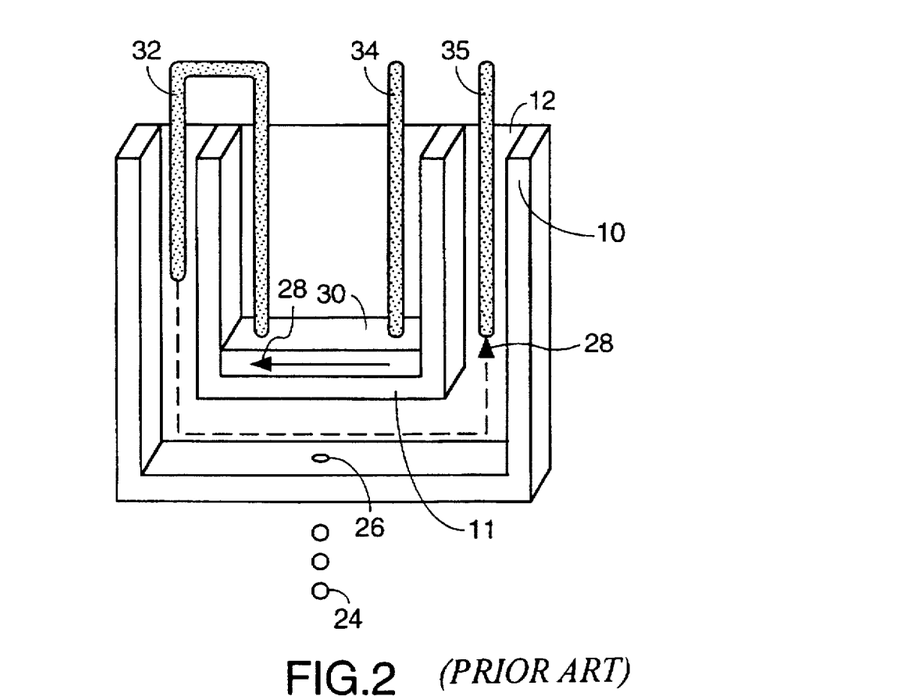
FIG. 2 illustrates a second type of solder drop ejector known to the inventors.

FIG. 2 is another embodiment of a solder drop ejector which operates in a manner similar to that of FIG. 1 but conducts a current (shown by arrows 28) through a fixed conductor 30 and through liquid solder in channel 12. Electrode 32 couples the fixed conductor 30 to the solder, and electrodes 34 and 35 are connected to a pulsed current source. As in FIG. 1, the magnetic fields created repulse the solder in the area of orifice 26 so as to eject droplets of ink 24. The thickness of wall 11 inversely affects the magnitude of the repelling force.

The solder ejectors of FIGS. 1 and 2 suffer from a number of drawbacks. One drawback is that it is difficult to mechanically manufacture the dielectric separation (wall portion 11) to a gap smaller than 0.2 mm. The wall portion 11 must withstand high heat and mechanical forces. Given this minimum practical separation between the two conducting portions, the solder ejector requires a very high driving current of 1,000 to 2,000 Amperes for about 50 microseconds to eject suitable solder drops from the orifice 26. This high energy requirement may create excessive ohmic heating in the liquid solder as well as increase the cost and complexity of the power supply.

Another problem with the solder ejectors of FIGS. 1 and 2 is that it is difficult to fill the channel 12 with solder at start-up, since the solder has to pass through a U-shaped narrow channel.

What is needed is a more efficient solder drop ejector which does not have the drawbacks of the above-described solder ejectors.

SUMMARY OF THE INVENTION

A solder drop ejector, which will also be referred to as a solder jet printhead, is disclosed where the dielectric layer separating conductors, through which currents are flowing in opposite directions, is formed of a film. The film may be made extremely thin, such as 0.5 microns, so that the necessary repulsion force generated by the oppositely flowing currents may be achieved with relatively low driving currents of 10–200 amperes. The thin dielectric film is not molded and is not required to provide mechanical support to a channel wall. Hence, the manufacturing of the resulting solder jet printhead is simplified and its reliability is improved.

Additionally, a U-shaped solder channel is eliminated in the preferred embodiment which simplifies the start-up procedure when solder is initially introduced into the printhead.

In a preferred embodiment of the invention, a first copper trace and a second copper trace are formed on a thin insulating film. The film with the two copper trances is laminated to an insulating substrate. A first hole in the film is formed to expose a portion of the first copper trace, and a second hole in the film is formed to expose a portion of the second copper trace. These holes are then filled with a wettable and insoluble metal such as nickel to form conductive vias.

A much thicker insulating layer is then placed over the thin dielectric film to form a channel for liquid solder to reside over at least a portion of the first copper trace and the second copper trace so as to be in direct contact with the two conductive vias. An orifice plate is then placed over the insulating channel layer so that an orifice for the ejection of droplets of liquid solder resides over the second copper trace. The solder channel extends in the direction of the second copper trace and is between the second copper trace and the orifice.

A pulsed current is then applied to the first copper trace and second copper trace such that current flows through the solder in a first direction and through the second copper trace in an opposite direction. Since the solder channel is between the second copper trace and the orifice, there is a repulsion of the solder in the vicinity of the orifice, and a solder droplet is ejected. Since the thin dielectric separating the second copper trace from the solder is not molded and does not provide any mechanical support for the solder channel, the dielectric can be made virtually any thickness, thus greatly reducing the required current through the conductive traces and the solder.

Numerous embodiments incorporating this technique are described.

DETAILED DESCRIPTION OF THE PREFERRED EMBODIMENTS

Figure 3:
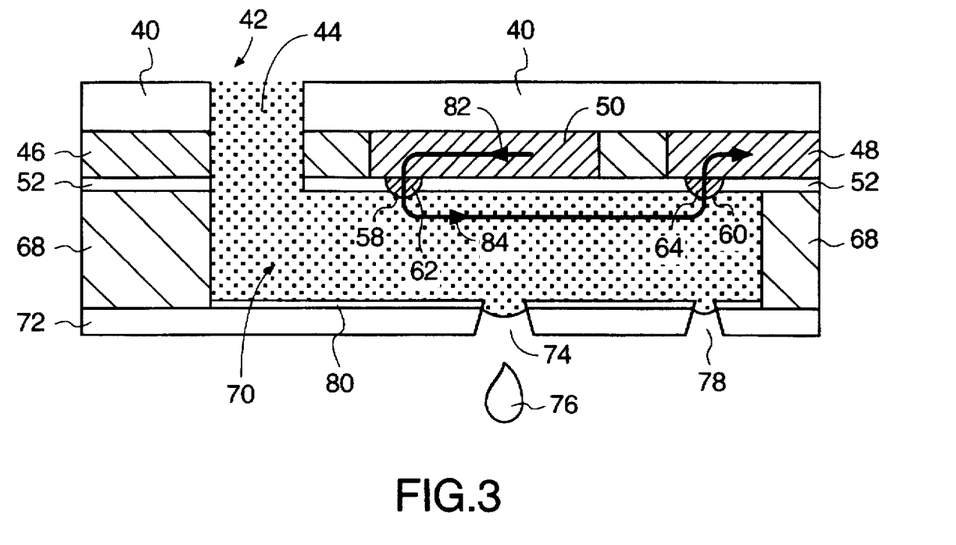
FIG. 3 is a cross-sectional view of the printhead portion of a solder drop ejector in accordance with a preferred embodiment of the invention, taken along line 3—3 in FIG. 4 and line 3—3 in FIG. 5.
Figure 4:
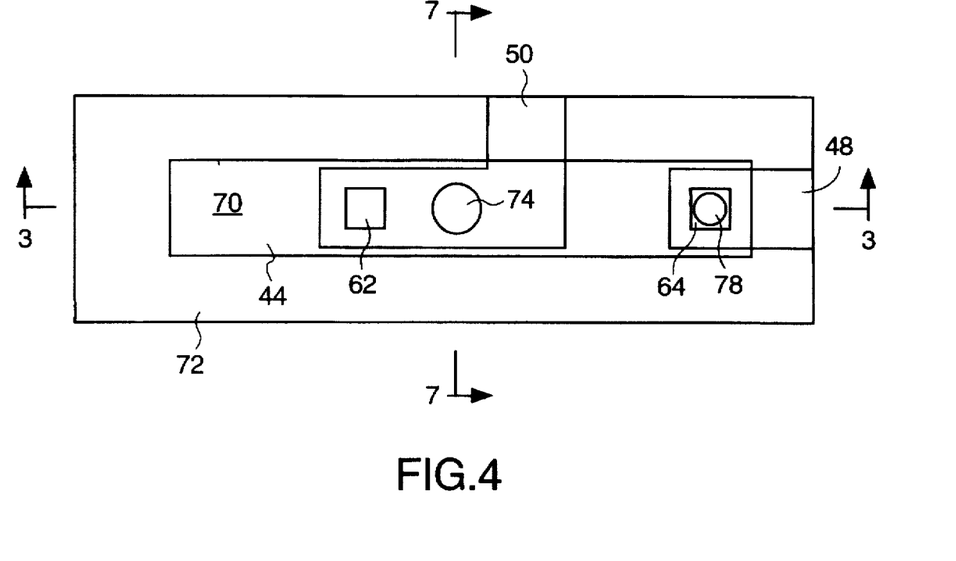
FIG. 4 is a bottom view of the printhead portion of the solder drop ejector with various levels simultaneously shown.
Figure 5:
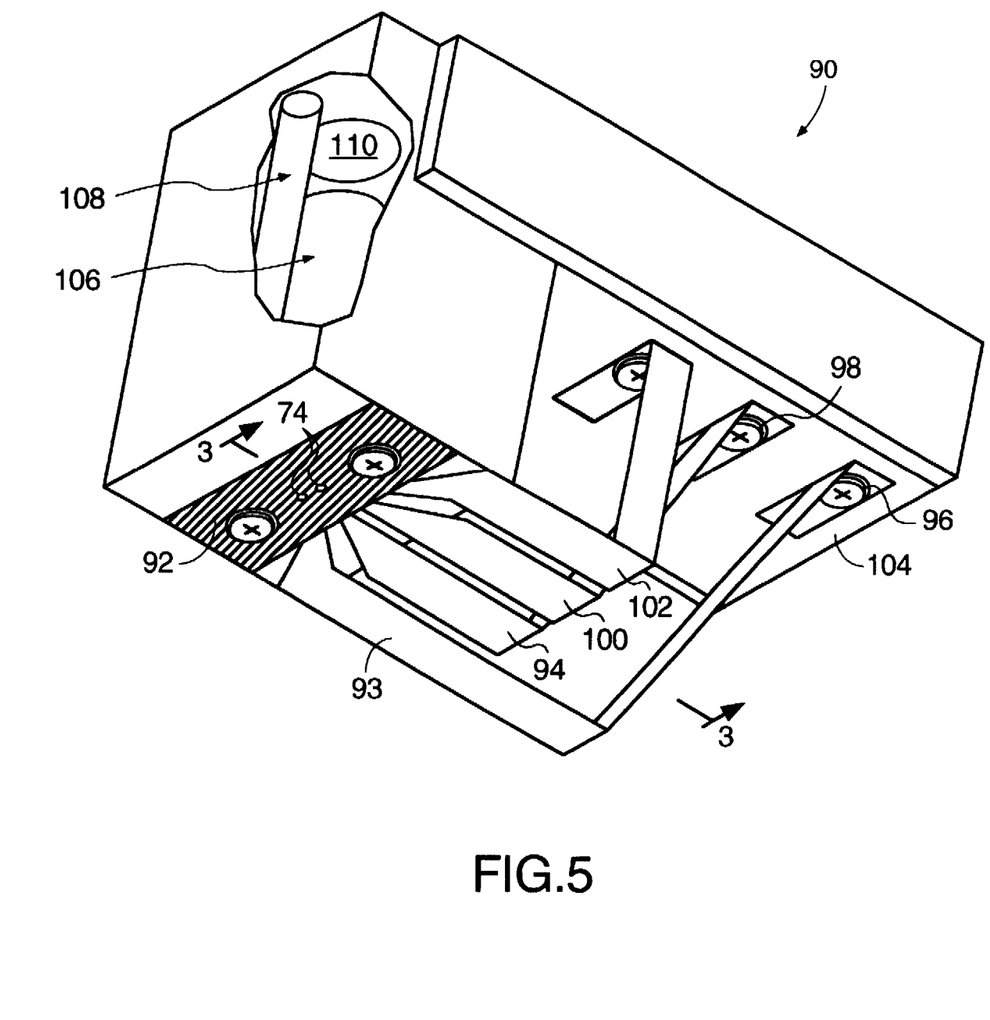
FIG. 5 is a perspective view of the completed solder drop ejector, looking up at the bottom of the ejector.

FIG. 3 is a cross-sectional view of the printhead portion of a solder drop ejector along line 3—3 in FIGS. 4 and 5.

FIG. 4 is a bottom view of the printhead portion of FIG. 3 with a number of layers shown.

An insulating substrate 40 may be polyimide, silicon, fired glass or any insulating material. Substrate 40 may even be a non-insulating material having an insulating layer, such as a polyimide laminate layer, formed over it to provide an insulating surface. Substrate 40 is formed, or etched, to have an opening 42 through which liquid solder 44 flows. Solder 44 may be any metal or alloy.

In the preferred manufacturing method, a layer of copper or other conductive material deposited on one surface of an insulating film 52, such as Kapton™ by DuPont, is patterned to form copper traces 48 and 50. An insulating layer 46, such as Kapton™, is then laminated or deposited between the traces 48 and 50 on film 52. In one embodiment, copper traces 48 and 50 have a thickness of approximately 50 microns. Film 52 may have a thickness of 25 to 100 μm.

Next, layer 46 is laminated to substrate 40, encapsulating traces 48 and 50.

In an alternative method, a layer of copper is deposited on the insulating surface of substrate 40 and etched to form traces 48 and 50, and an insulating material 46 is then deposited on the resulting surface.

Next, in this alternative method, a thin insulating film of $SiO_2$ or any other insulating material, such as Kapton™, is deposited or laminated onto the surface of the copper traces 48 and 50 and insulating layer 46. An extremely thin insulating film 52 may be formed by sputtering the insulating material, such as $SiO_2$. This film may be on the order of 0.1–0.5 microns in thickness.

Since the film 52 is not required for mechanical support and not required to be molded, the film 52 can be made any thickness. Since the repulsion force of the solder 44 during a current pulse is inversely related to the thickness of the film 52, film 52 should be made thin to reduce the current requirements for the ejector.

Openings 58 and 60 are then formed in the insulating film 52, and these openings are filled with a conductive material which is wettable and relatively insoluble in the solder used. Such a material may be nickel or a nickel coated with gold. Forming such conductive vias 62 and 64 may be accomplished by sputtering a layer of the conductive material over the surface of the insulating film 52 and then etching the material so as to leave only the conductive vias 62 and 64. A subsequent electroplating operation may be used to increase the thickness of conductive vias 62 and 64.

An insulating barrier layer 68 is then formed or laminated over the insulating film 52 to create a solder channel 70 in which liquid solder 44 resides. The liquid solder 44 in the channel 70 comes in contact with vias 62 and 64 to create an electrical conduction path between copper traces 48 and 50. In one embodiment, the barrier layer 68 is on the order of 200 microns; however, this thickness may be larger or smaller depending upon the viscosity of the solder, the solder drop sizes desired, the currents used, and other factors which would be understood by those skilled in the art.

In one embodiment, as described later, the barrier layer 68 is formed of many layers laminated together. In another embodiment, the barrier layer 68 is a photoresist which is etched using conventional photolithographic techniques. Since the liquid solder 44 generates a large amount of heat which is difficult to dissipate, the materials forming the solder jet printhead must be such as to withstand this high heat without deforming and delaminating. Additionally, the coefficients of thermal expansion of the various layers should be substantially similar to one another to prevent delamination and warping.

An orifice plate 72 (or nozzle plate) is then placed over the resulting structure so as to complete the solder channel 70 and provide an orifice 74 for ejection of the solder droplets 76. In the preferred embodiment, a vent hole 78 is also provided to allow air to escape from channel 70 when being filled with the liquid solder 44.

In one embodiment, orifice plate 72 is a metal, such as nickel. If orifice plate 72 is a metal, an insulating layer should be formed on its surface within channel 70 to electrically insulate the plate 72 from the solder 44. In a preferred embodiment, orifice plate 72 is a dielectric film such as Kapton™. A third option is to form orifice plate 72 from an inorganic insulator, such as glass or ceramic.

In the preferred embodiment, the orifice plate 72 and the solder channel 70 are coated with a wetting agent 80, such as nickel for tin/lead solder, to assist the flow of solder at start-up. The orifice 74 and vent hole 78 should be formed in or coated with a non-wettable material. By preventing wetting of orifice 74 and vent hole 78, the liquid solder does not freely flow out of orifice 74 under the static gravitational force.

The first copper trace 48 is connected to a first terminal of a pulsed current supply, and the second copper trace 50 is connected to a second terminal. A current pulse is then applied to the terminals such that a current flows through the second copper trace 50 in the direction of arrow 82, flows back through the liquid solder 44 in the solder channel 70 in the direction of arrow 84, and then flows through the first copper trace 48 to complete the circuit. Since the direction of current in copper trace 50 is opposite to the direction of current through solder 44, the magnetic fields created by the currents repulse the solder 44 in the vicinity of orifice 74 to eject a droplet of solder 76. The current directions may also be reversed while obtaining identical results.

In the preferred embodiment, orifice 74 is provided with a divergent opening so that an advancing meniscus will be pulled back to the smallest diameter by the surface tension of the solder to minimize its surface energy.

The volume of each ejected droplet 76 may be controlled within a range of about ±25% by adjusting the width or magnitude of the current pulse. This provides the ability to adjust drop volume drop-to-drop or to calibrate a single orifice to a predetermined drop of volume.

Throughout this disclosure, elements identified with the same numerals may be identical.

FIG. 5 is a bottom perspective view of a solder drop ejector 90 incorporating the printhead 92 shown in FIG. 3. Copper conductors 93 and 94 connect terminals 96 and 98 to the copper traces 48 and 50. Terminals 96 and 98 are connected to a pulsed current source. Solder ejector 90 contains two independently operated printheads, and copper conductors 100 and 102 are connected to associated copper traces for the second printhead and to a pulsed current source.

In a preferred embodiment, the printhead 92 is mounted on an insulator block 104 for mounting to a support fixture (not shown). A solder supply chamber 106 contains liquid solder. The solder chamber may be formed in an aluminum block lined with an insoluble material, such as $SiO_2$ or Teflon, to prevent contamination of the solder. A reusable resistive heater cartridge 108 is provided proximate to the solder chamber 106 to maintain the solder in a molten state. Other types of heaters 108 may also be used.

In the preferred embodiment, the solder ejector 90 is a disposable cartridge which is initially supplied with an amount of solder in chamber 106. The solder ejector 90 is inserted into a simple receptacle with a bottom opening for the printhead orifices. In an alternate embodiment, the solder ejector 90 may be reused or an external solder source is provided through opening 110 to the solder chamber 106. The liquid solder is provided to the orifice 74 area by capillary action. The solder flow may be assisted by a gravity feed or a pump. Although the droplets of solder are independently ejected through the two orifices 74, the solder for both orifices 74 is supplied by the single chamber 106.

Additional conductors (not shown) are connected to a power supply source for energizing heater 108. A thermostat internal to the ejector 90 controls the temperature of the liquid solder to be ±5% of the desired temperature. The temperature is preferably sufficiently above (e.g., 15° C.) the melting point to minimize variations of viscosity with temperature.

Figure 6:
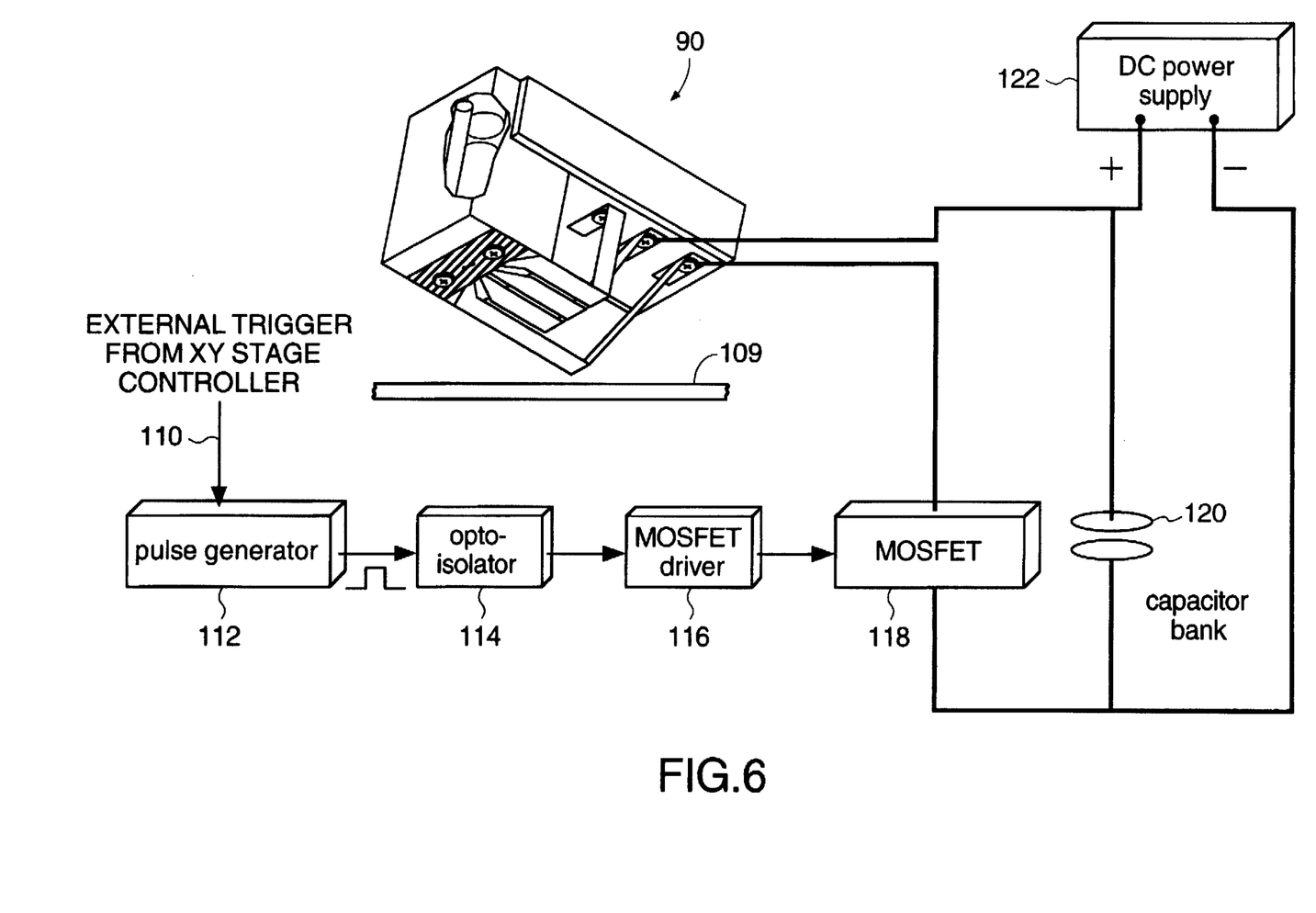
FIG. 6 illustrates the solder drop ejector of FIG. 5 connected to a pulsed current generator.

FIG. 6 illustrates a current pulse generator for the ejector 90.

Once the workpiece 109 is in its desired position, a trigger signal 110 is provided from the X-Y stage controller to a pulse generator 112 which delivers either a single pulse or a predetermined number of pulses, depending upon the desired amount of solder to be applied to the workpiece. The pulse is applied to an optical isolator 114, which electrically isolates the pulse generator 112 from the high voltages in the driver circuit. The isolator 114 then triggers a MOSFET driver 116. The MOSFET driver 116 drives a large MOSFET 118, which acts like a solid state switch to couple a stored charge in a capacitor bank 120 to the terminals of the ejector 90. A DC power supply 122 charges the capacitor bank 120 to between 0–200 volts between current pulses. Capacitor bank 120 typically has a total capacity of 50–100 µF. The typical pulse is 35 volts for 30–50 microseconds at 150 amps. The typical series resistance of ejector 90 is between 0.025 and 0.25 ohms, while the effective series resistance of the capacitor bank 120 through the MOSFET 118 is about 0.01 ohm.

Figure 7:
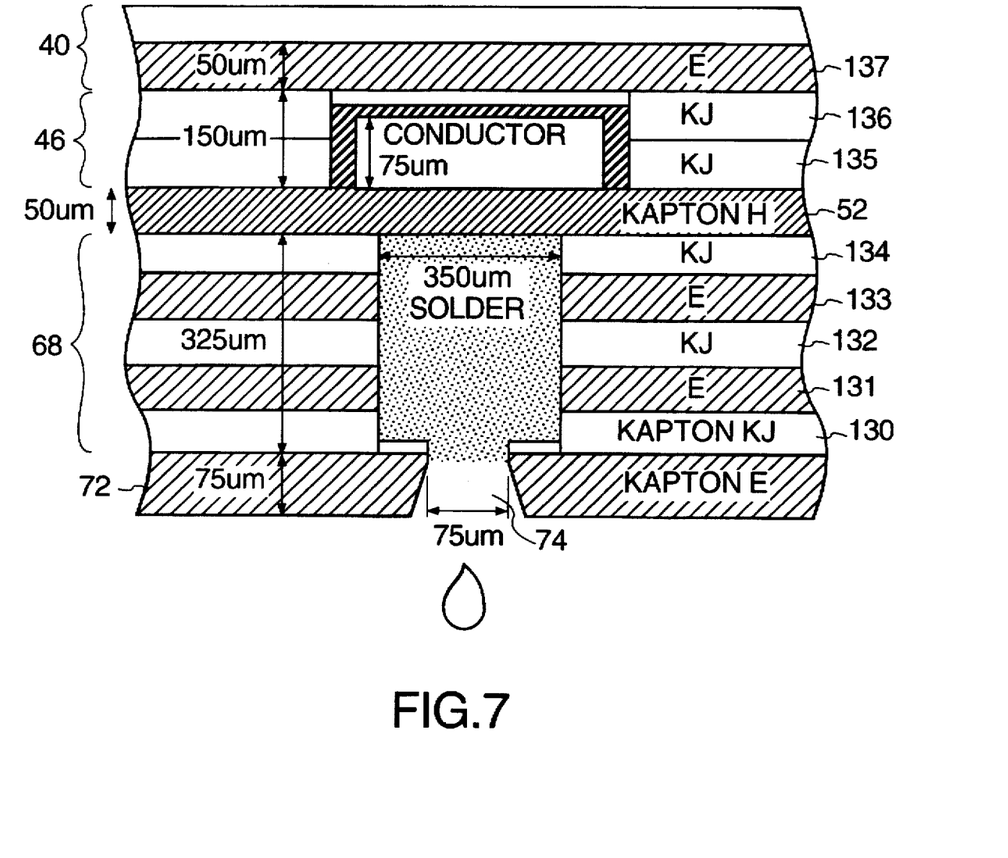
FIG. 7 is a cross-sectional view along line 7—7 in FIG. 4 of a portion of the solder drop ejector illustrating the various dielectric films which are used to form the preferred solder jet printhead.

FIG. 7 is a cross-sectional view of the printhead portion of a polyimide based ejector as seen perpendicular to the plane of FIG. 3 bisecting orifice 74. In this particular embodiment, the orifice plate 72 is formed of an insulating polyimide material, such as Kapton™. The orifice 74 has a diameter on the order of 75 microns and may be laser ablated. The various dimensions of the layers 72 and 130–137 and their materials are identified.

Kapton E™ is a very heat resistive and highly insulating material manufactured by DuPont. Kapton KJ™ has a melting temperature lower than that of Kapton E™ and is used as a thermoplastic adhesive between the layers of Kapton E™. The multilayer structure is easily fabricated since the same materials are used for different portions of the printhead. The various Kapton™ layers are laminated under heat and pressure.

Figure 8:
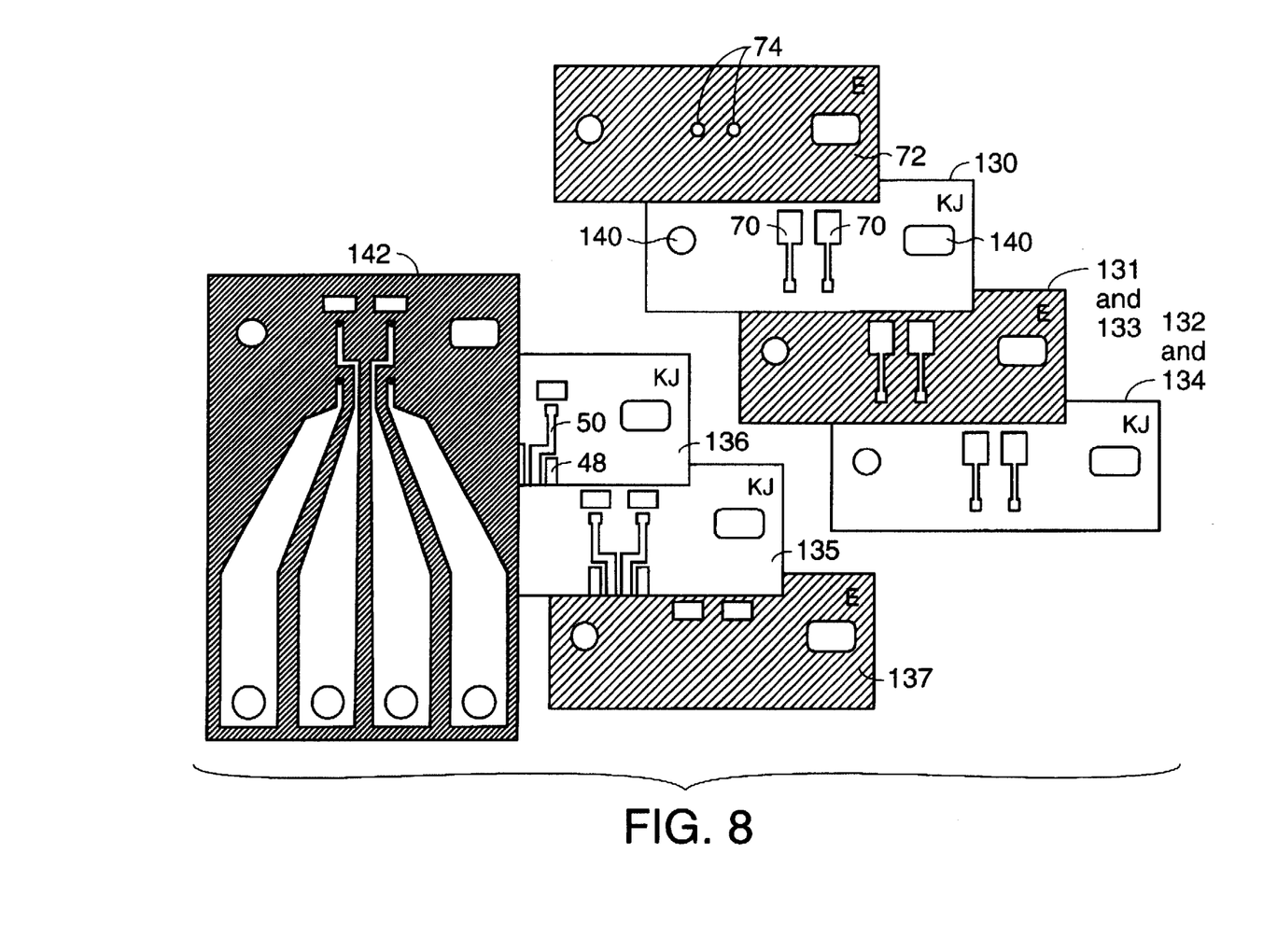
FIG. 8 illustrates the patterns formed on the various dielectric layers in FIG. 7.

FIG. 8 illustrates the various Kapton™ layers 72 and 130–137 separated from one another. Alignment holes 140 in each layer are for fitting over alignment pins. The alignment holes 140 are slightly smaller (e.g., 20 microns smaller) than the pin (e.g., having a diameter of 800 microns) such that a slight deformation is required to fit these parts over the alignment pin. The symmetrical nature of the plastic deformation of a round hole makes sure that each layer is aligned to one another. In the embodiment of FIG. 8, the layers for a two-orifice solder drop ejector 90 (FIG. 5) are illustrated, where each solder channel 70 pattern and copper trace 48/50 pattern have a symmetrical pattern on the other side of the center line. The top Kapton™ layer 142 contains the conductive interconnect traces for interconnecting the larger conductors 93, 94, 100 102 (FIG. 5) to the copper traces 48 and 50.

Figure 9:
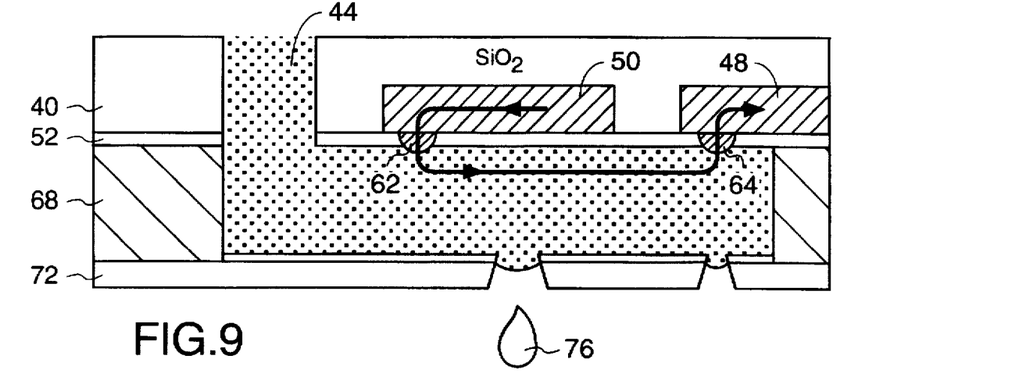
FIG. 9 is a cross-sectional view of a solder drop ejector similar to that of FIG. 3 but where the substrate is etched glass.

FIG. 9 is a cross-sectional view of the printhead portion of a solder drop ejector similar to FIG. 3 but where the substrate 40 is formed of glass. In all embodiments, the vias 62 and 64 may be deleted so that direct contact is made between the conductive traces 48 and 50 and the solder 44.

Figure 10:
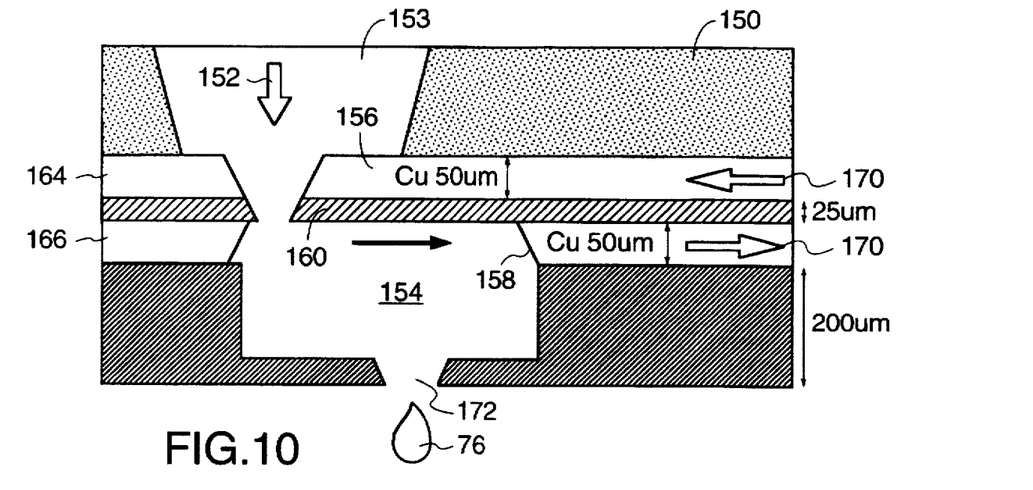
FIG. 10 is a cross-sectional view of another embodiment solder drop ejector employing two layers of copper traces, illustrating one means of supplying solder to a solder chamber through a copper layer and an insulating layer.

FIG. 10 is a cross-sectional view of the printhead portion of another embodiment solder ejector illustrating a printhead with two insulated layers of copper traces. An insulating substrate 150 is provided with a hole 153 through which solder is introduced, in the direction of arrow 152, into a solder channel 154. A first copper trace layer 156 extends into hole 153 so as to come in contact with the liquid solder before entering channel 154. The liquid solder in channel 154 is in electrical contact with a second copper trace 158 insulated from the first copper trace 156 by a thin dielectric layer 160. In this embodiment, the dielectric layer 160 is a 25 micron Kapton™ film. The copper trace portions 164 and 166 are not connected to any electrodes and are electrically floating. These floating traces 164 and 166 may be replaced if desired by an insulating layer. The purpose of these floating traces is to maintain an equal stack height of the laminations.

A pulsed current is applied between copper traces 156 and 158 such that current flows in the direction of arrows 170 through the copper traces and through the solder in channel 154. As seen, the direction of current through the copper trace 156 below the solder channel 154 is in a first direction while the current flow in the solder within chamber 154 flows in an opposite direction. The magnetic fields created repel the solder in channel 154 to eject a drop of solder 76 from orifice 172. Orifice 172 may also take the shape shown in FIG. 3.

Figure 11:
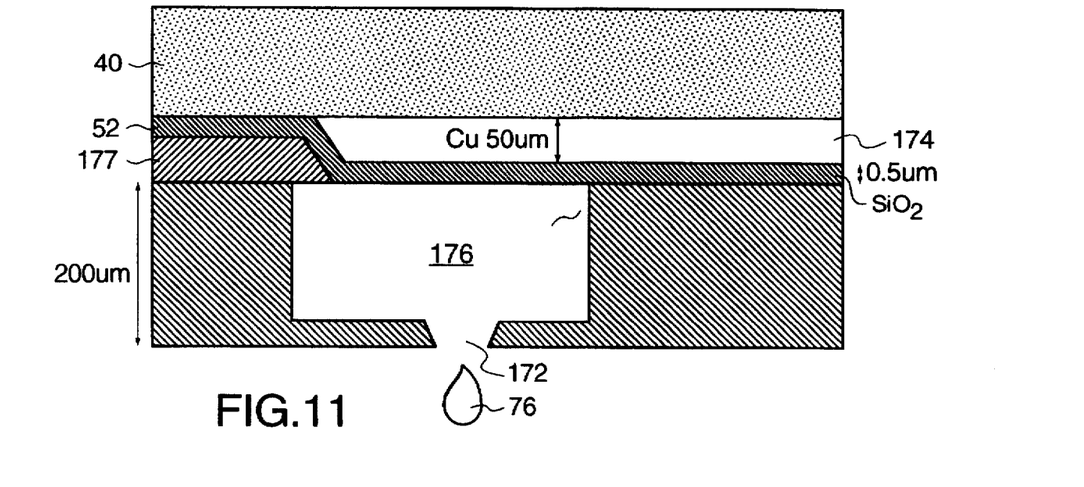
FIG. 11 is a cross-sectional view of another embodiment solder drop ejector which uses two insulated current paths to eject solder droplets.

In another embodiment, shown in FIG. 11, two separate current carrying circuits are formed which carry currents flowing in opposite directions. The copper trace 174 is not electrically connected to the solder within chamber 176 but forms a separate conductive path between two external electrodes. A thin insulating film 52 separates trace 174 from chamber 176. Another insulating film 177 is used for equalizing the height of the laminations. The current through the solder in chamber 176 flows between two electrodes in contact with the solder within chamber 176. The cross-section of FIG. 11 does not cut across these electrodes, and numerous configurations of these electrodes may be used. When simultaneous current pulses are applied to the solder and the copper trace 174, the current flow through the solder is in a direction (e.g., into the plane of FIG. 11) opposite to the current flow through trace 174 (e.g., out of the plane of FIG. 11) such that the resulting magnetic fields repel the solder through orifice 172 to create a solder droplet 76.

Figure 12A:
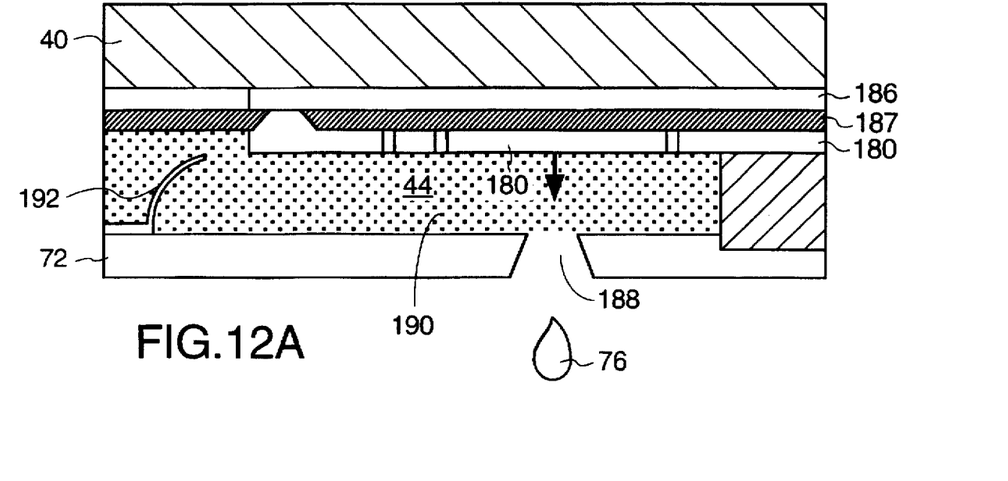
FIG. 12A is a cross-sectional view of a solder drop ejector using a flexible conductive strip as a diaphragm for ejecting a droplet of solder from an orifice when a current is pulsed through the conductive strip.
Figure 12B:
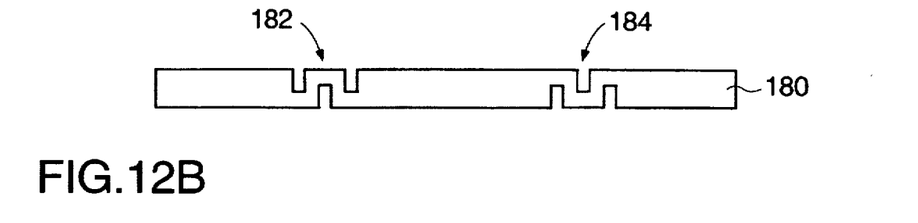
FIG. 12B is a top down view of the flexible conductive strip in FIG. 12A.

FIG. 12A is a cross-sectional view of the printhead portion of another solder drop ejector which uses a flexible diaphragm formed of a flexible metallic conductor 180. FIG. 12B is a top down view of the conductor 180 having flexure points 182 and 184 which enable the metal strip to flex between flexure points 182 and 184. A copper (or other metal) trace 186 parallel to and insulated from metallic conductor 180 by dielectric layer 187 forms a current path with conductor 180. A current pulse through conductors 186 and 180 causes the current to flow in a first direction through copper trace 186 and in an opposite direction through conductor 180, causing conductor 180 to be repulsed in the direction of orifice 188. This pushes the liquid solder 44 in the solder chamber 190 out through orifice 188 to form an ink droplet 76.

To prevent the displaced solder 44 being pushed back out of the chamber 190, a micro valve 192 is formed as a one-way valve to allow solder 44 to enter chamber 190 but restrict the flow of solder 44 back out of chamber 190. Thus, the displaced solder is forced through the orifice 188.

Figure 13:
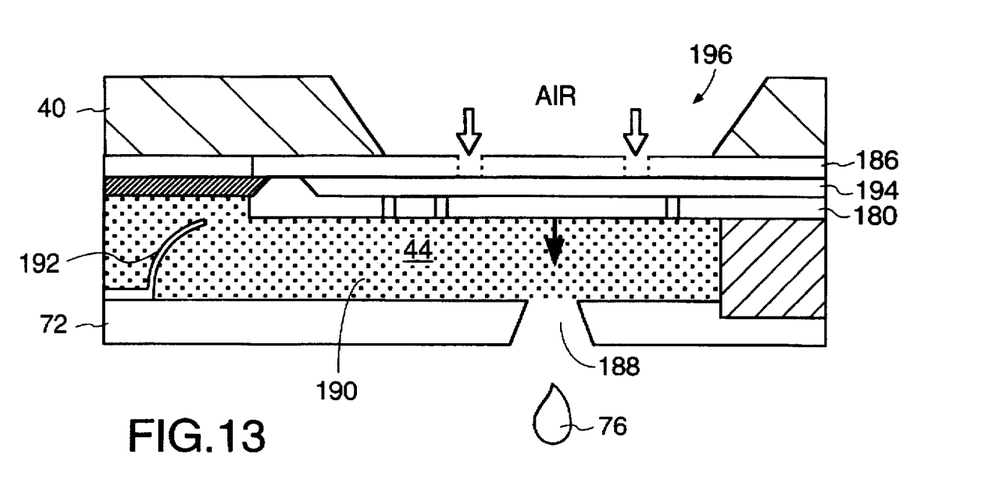
FIG. 13 is a modification of the structure of FIG. 12A which opens the substrate to air to allow freer movement of the diaphragm.

FIG. 13 is a modification of the printhead of FIG. 12A where, instead of a layer of insulating material 187 formed between conductors 180 and 186, an air gap 194 is formed, where air is allowed to enter the air gap 194 through a hole 196 in the insulating substrate 40. This allows the flexible conductor 180 to more freely be flexed toward orifice 188.

It would be understood from the various cross-sectional views shown how the entire solder drop ejector can be manufactured in view of the preferred embodiment of FIG. 5.

Figure 14:
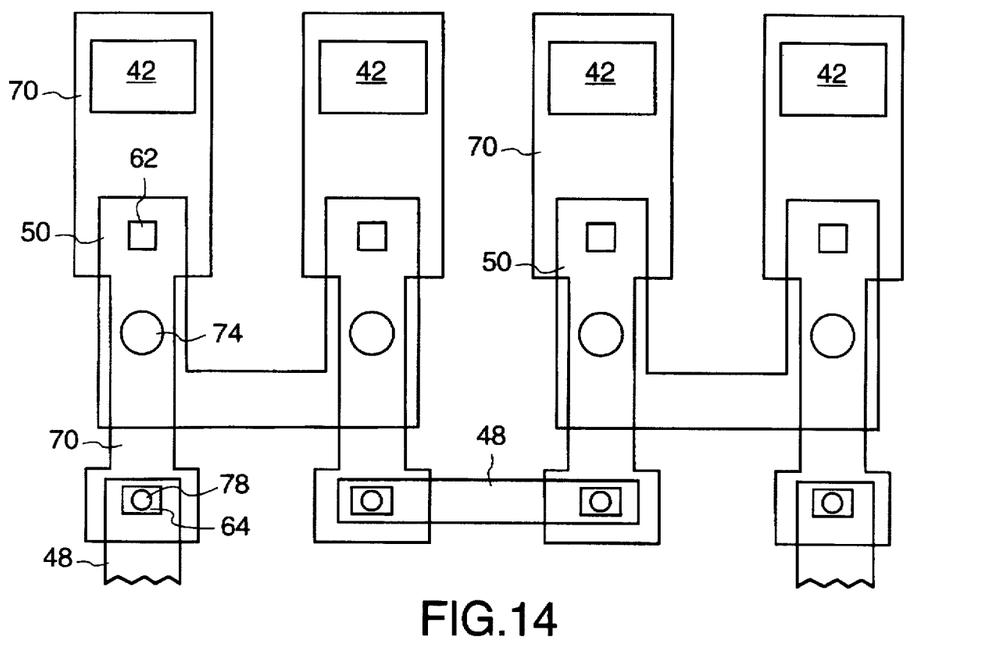
FIGS. 14 and 15 illustrate how the present invention can be used to create multi-orifice solder jet printheads.

FIG. 14 is a bottom view of the printhead portion (similar to FIG. 4) of a solder drop ejector which contains four orifices to illustrate how the solder channels and copper traces may be connected in series. The structure of FIG. 14 shows a number of layers which would normally be obscured by other layers to illustrate the pertinent portions of the printhead. Identified in FIG. 14 are the solder channel 70, opening 42 to the channel 70, via 62, via 64, copper trace 48, copper trace 50, orifice 74, and vent hole 78. The solder channel 70 and copper trace 50 overlap along the extended strip facing orifice 74. Solder is provided to channel 70 through opening 42 in communication with a solder supply reservoir (not shown).

The structure of FIG. 14 may be extended for any number of orifices 74. The structure of FIG. 14 may be formed using the same steps used to form the structure of FIG. 3 or any of the other embodiments.

Figure 15:
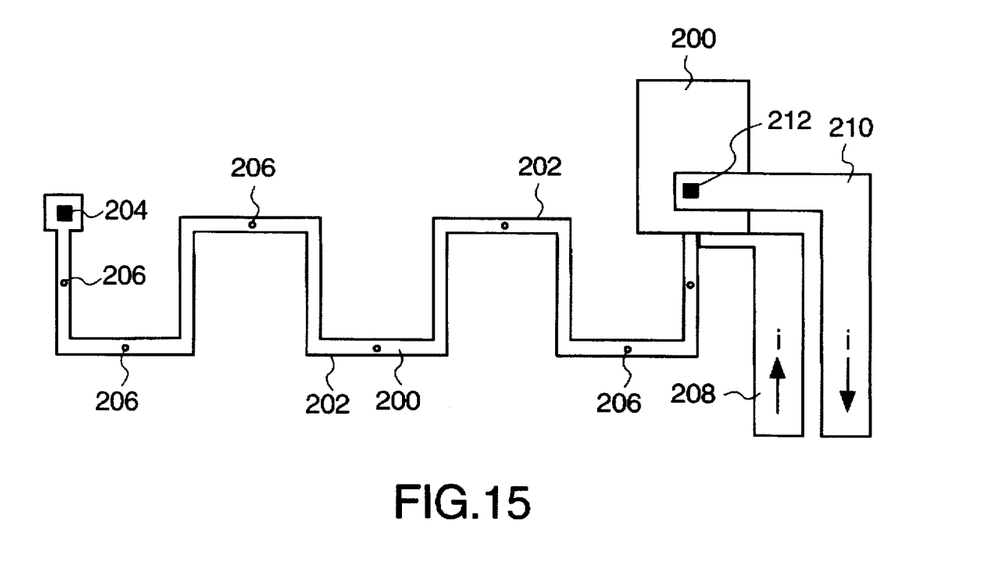

FIG. 15 is a bottom view of printhead portion of another embodiment multi-orifice solder ejector illustrating both a serial solder channel 200 and a serial copper trace 202 insulated from the solder channel 200 by a thin dielectric film as previously discussed. A via 204 electrical connects the trace 202 and the solder within channel 200. The current through trace 202 and channel 200 flow in opposite directions to repel the solder through orifices 206. A conductor 208 couples a current pulse to trace 202, and a second conductor 210 completes the circuit by being connected to the solder in the solder channel 200 by via 212. The structure of FIG. 15 may be formed using the same techniques as used in previously described embodiments.

Accordingly, various embodiments of a solder drop ejector have been shown which enable the use of a very thin dielectric film between the solder channel (or a diaphragm) and a fixed conductor. For solders with relatively high melting temperatures, a ceramic based structure can be implemented. For solders with relatively lower melting temperatures, such as lead/tin solder, a polymer based structure is feasible.

A polymer based structure offers the practical advantage of flexibility in manufacturing. The dimension of the solder channel width as well as orifice size is laser ablated, which is software controlled. The dimension of the channel height is controlled by varying the polyimide layer thickness and number of layers during lamination.

A self-contained solder drop printing cartridge incorporating the various printheads described consists of a body containing a charge of solder, a droplet ejection device, an electrical interconnect, and provision for heating and monitoring temperature. Monitoring temperature may be performed by a thermostat connected to the aluminum block 104 in FIG. 5. There are several reasons why a self-contained solder droplet printing cartridge is desirable:

- The quantity of solder consumed in a single manufacturing shift of wafer bumping is small such that even a 5 milliliter capacity would be adequate for many applications.
- A self-contained solder print cartridge offers reliability and serviceability advantages. No expertise is required in a manufacturing environment to replace a cartridge which is either out of solder or malfunctioning.

Delivery (purification, filtering, oxidation prevention, back pressure regulation, etc.) of liquid metal is simplified over other methods known in the art which involve bulk quantities of liquid metal and active pressure regulation, dissolved gas monitoring, etc.

By changing solder jet cartridges, different alloys and drop volumes may easily be used for different applications in the same bench-top bumping system. Cartridges may be customized to deliver a specific drop volume for one of several common bump diameters (75, 100, 125, and 250 microns) or custom bumps. Different cartridges may be produced for applications requiring special solder alloys. The changeover in manufacturing requires only removing one cartridge and replacing it with another. The drive parameters (pulse voltage and pulse width) may be changed according to the specific cartridge used.

In a multiple-orifice printhead, the orifices may be arranged in a linear array or offset. The preferred embodiment incorporates a two-drop printhead where the solder channel beneath each orifice is energized independently but shares a common liquid metal feed system.

While particular embodiments of the present invention have been shown and described, it will be obvious to those skilled in the art that changes and modifications may be made without departing from this invention in its broader aspects, and therefore the appended claims are to encompass within their scope all such changes and modifications as fall within the true spirit and scope of this invention.

What is claimed is:

1. A solder drop ejector comprising:

an insulating substrate;

a first conductor located on a surface of said insulating substrate;

a dielectric layer located on said first conductor, said dielectric layer having at least one opening for exposing a first portion of said first conductor;

a solder channel, for containing liquid solder, located on said dielectric layer such that liquid solder in said solder channel will be in electrical contact with said first conductor through said opening in said dielectric layer and insulated from said first conductor along a second portion of said first conductor by said dielectric layer, said solder channel communicating with an orifice; and electrodes for conducting a current through said first conductor in a first direction and conducting a current through said liquid solder within said solder channel in a direction substantially opposite to said first direction, said first conductor, said solder channel, and said orifice being arranged such that a sufficient electric current through said first conductor and said liquid solder in said solder channel generates magnetic fields which force an amount of said solder through said orifice.

2. The ejector of claim 1 wherein said first conductor comprises a conductive trace.

3. The ejector of claim 1 wherein said dielectric layer comprises a polymer layer laminated onto a surface of said first conductor.

4. The ejector of claim 3 wherein said polymer is a polyimide.

5. The ejector of claim 1 wherein said dielectric layer is sputtered onto a surface of said first conductor.

6. The ejector of claim 1 wherein said dielectric is silicon dioxide ($SiO_2$).

7. The ejector of claim 1 further comprising:

a conductive via formed in said opening in said dielectric layer to electrically connect said first portion of said first conductor to said liquid solder in said solder channel, said via being formed of a material relatively insoluble in said liquid solder.

8. The ejector of claim 1 further comprising:

a second conductor connected between one of said electrodes and said liquid solder within said solder channel.

9. The ejector of claim 8 wherein said second conductor is located on said surface of said insulating substrate, said dielectric layer being located on said second conductor and having a second opening for exposing a first portion of said second conductor, said liquid solder in said solder channel being electrically coupled to said second conductor through said second opening.

10. The ejector of claim 8 wherein said second conductor is insulated from said first conductor by a second dielectric layer.

11. The ejector of claim 1 wherein said ejector further comprises a plurality of solder channels, each of said solder channels communicating with an associated orifice.

12. The ejector of claim 1 wherein said solder channel communicates with a plurality of orifices.

13. The ejector of claim 1 wherein said ejector further comprises a plurality of solder channels, a plurality of orifices, and a plurality of first conductors, wherein a current is applied through each pair of a solder channel and a first conductor so as to eject an amount of solder through an associated orifice.

14. The ejector of claim 1 further comprising a heater for maintaining said solder in a molten state.

15. The ejector of claim 1 wherein said ejector is configured as a replaceable cartridge which can be inserted into a receptacle.

16. The ejector of claim 1 wherein said dielectric layer has a thickness between approximately 0.1 and 200 microns.

17. A solder drop ejector comprising:

an insulating substrate;

a first conductor located on a surface of said insulating substrate;

a dielectric layer located on said first conductor such that said first conductor is sandwiched between said substrate and said dielectric layer;

a solder channel, for containing liquid solder, located on said dielectric layer so as to be insulated from said first conductor by said dielectric layer, said solder channel communicating with an orifice;

a first set of electrodes for conducting a current through said first conductor in a first direction proximate to said solder channel; and a second set of electrodes for conducting a current through said liquid solder in said solder channel in a direction opposite to said first direction, said first conductor, said solder channel, and said orifice being arranged such that a sufficient electric current through said first conductor and a sufficient electric current through said liquid solder in said solder channel generate magnetic fields which force an amount of said solder through said orifice.

18. A solder drop ejector comprising:

an insulating substrate;

a first conductor located on a surface of said insulating substrate;

a dielectric layer located on said first conductor;

a second conductor insulated from said first conductor by said dielectric layer along a first portion of said second conductor and connected to said first conductor through said dielectric layer at a second portion of said second conductor, said second conductor having a degree of movement substantially perpendicular to a plane of said first conductor and said dielectric layer;

a solder channel, for containing liquid solder, located on said second portion of said second conductor, said solder channel communicating with an orifice;

a first electrode connected to said first conductor; and a second electrode connected to said second conductor, said first conductor, said second conductor, said solder channel, and said orifice being arranged such that a sufficient electric current through said first conductor and said second conductor generates magnetic fields which flex said second conductor in a direction toward said orifice to force an amount of said solder through said orifice.

19. The ejector of claim 18 wherein said dielectric layer is laminated onto said first conductor.

20. The ejector of claim 18 wherein said dielectric layer is air.

21. The ejector of claim 18 wherein said substrate has an opening for allowing air to gain access to a gap between said first conductor and said second conductor, and wherein said dielectric layer is air.

* * * * *